United States Patent
Jackson et al.

(10) Patent No.: US 8,662,030 B2
(45) Date of Patent: Mar. 4, 2014

(54) SPLIT CYCLE RECIPROCATING PISTON ENGINE

(75) Inventors: Neville Stuart Jackson, Hove (GB); Andrew Farquhar Atkins, Steyning (GB)

(73) Assignee: Ricardo UK Limited, Shoreham-by-Sea (GB)

( * ) Notice: Subject to any disclaimer, the term of this patent is extended or adjusted under 35 U.S.C. 154(b) by 177 days.

(21) Appl. No.: 13/133,765

(22) PCT Filed: Dec. 11, 2009

(86) PCT No.: PCT/GB2009/002867
§ 371 (c)(1),
(2), (4) Date: Jan. 3, 2012

(87) PCT Pub. No.: WO2010/067080
PCT Pub. Date: Jun. 17, 2010

(65) Prior Publication Data
US 2012/0103314 A1 May 3, 2012

(30) Foreign Application Priority Data
Dec. 12, 2008 (GB) .................................. 0822720.9

(51) Int. Cl.
*F02B 33/22* (2006.01)
(52) U.S. Cl.
USPC .................... 123/70 R; 123/65 R; 123/1 A
(58) Field of Classification Search
USPC ...................................... 123/70 R, 65 R, 2, 3
See application file for complete search history.

(56) References Cited

U.S. PATENT DOCUMENTS

| 2,380,778 | A | | 7/1945 | Murdock |
| 3,932,987 | A | | 1/1976 | Munzinger |
| 4,186,561 | A | * | 2/1980 | Wishart .......................... 60/620 |
| 6,675,781 | B1 | | 1/2004 | Markley |
| 6,951,211 | B2 | * | 10/2005 | Bryant ........................ 123/559.1 |
| 7,350,513 | B2 | * | 4/2008 | Fults et al. ..................... 123/542 |
| 2007/0221145 | A1 | * | 9/2007 | Forner et al. ................ 123/41.01 |
| 2008/0034755 | A1 | * | 2/2008 | Tour et al. ........................ 60/620 |
| 2009/0056670 | A1 | | 3/2009 | Zhao |
| 2010/0077987 | A1 | * | 4/2010 | Voisin ........................... 123/25 C |
| 2010/0313840 | A1 | * | 12/2010 | Day et al. ....................... 123/1 A |

FOREIGN PATENT DOCUMENTS

EP  1176291 A2  1/2002
WO  9421905 A1  9/1994

OTHER PUBLICATIONS

PCT International Search Report for PCT/GB2009/002867 dated Feb. 24, 2010.

* cited by examiner

*Primary Examiner* — Noah Kamen
*Assistant Examiner* — Long T Tran
(74) *Attorney, Agent, or Firm* — Harry K. Ahn; McCarter & English, LLP

(57) ABSTRACT

A split cycle reciprocating piston engine includes a compression cylinder (2) accommodating a compression piston (4) and an expansion cylinder (12) accommodating an expansion piston (14). The compression cylinder (2) has an inlet port (30) for the admission of air and an outlet port (36) which communicates with a first path of a heat exchanger (5). The expansion cylinder (12) has an inlet port (52), which communicates with the first path of the heat exchanger (5), and an outlet port (56), which communicates with a second path of the heat exchanger (5) in heat exchange relationship with the first path. The method of operating the engine includes injecting a liquefied, non-oxidizing, non-combustible gas, such as nitrogen, into the compression cylinder (2).

12 Claims, 1 Drawing Sheet

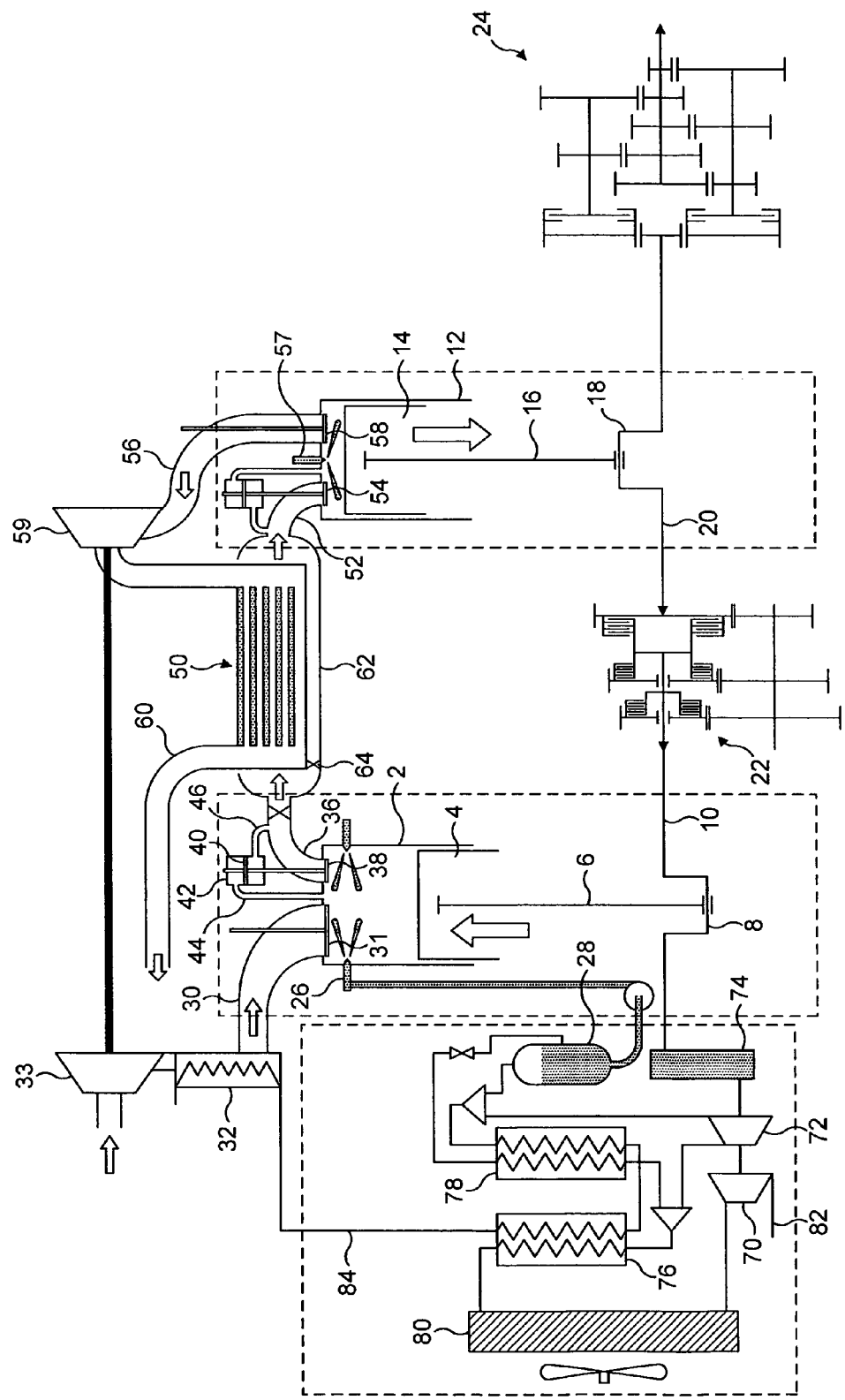

SPLIT CYCLE RECIPROCATING PISTON ENGINE

CROSS REFERENCE TO RELATED APPLICATIONS

This application is a national phase of PCT application No. PCT/GB2009/002867, filed Dec. 11, 2009, which claims priority to GB patent application No. 0822720.9, filed Dec. 12, 2008, all of which are incorporated herein by reference.

The invention relates to split cycle reciprocating piston engines and is concerned with that type of engine which has been referred to as an isoengine. More specifically, the invention relates to a method of operating a split cycle reciprocating piston engine including a compression cylinder accommodating a compression piston, an expansion cylinder accommodating an expansion piston, the compression cylinder having an inlet port for the admission of air and an outlet port which communicates with a first path of a heat exchanger, the expansion cylinder having an inlet port, which communicates with the first path of the heat exchanger, and an outlet port which communicates with the second path of the heat exchanger, in heat exchange relationship with the first path, the method including injecting a liquid into the compression cylinder.

Such engines are known and are disclosed in e.g. WO 07/081,445.

In a conventional internal combustion engine using the Diesel or Otto cycle, air is compressed adiabatically. Compression of the inlet charge causes a corresponding increase in temperature resulting from the energy input during compression. In any event, each cylinder of the engine is used to carry out both compression and expansion, that is to say combustion, alternately during different strokes of the engine cycle.

An isoengine, however, operates fundamentally differently in that compression and combustion/expansion occur in different cylinders. Whilst air is compressed in the compression cylinder, a liquid, typically atomised water, is also injected into the cylinder and this absorbs the heat that is produced so that the compression is at least quasi-isothermal. Due to the fact there is no substantial increase in temperature, the work required to perform the compression is substantially reduced. The cool compressed air then flows through the outlet port of the compression cylinder into one path of a heat exchanger or recuperator, in which it is heated to a substantial temperature before flowing into the expansion cylinder. Fuel, typically diesel fuel or natural gas, is then injected into the heated compressed air and burnt. Due to the fact that the inlet valve of the expansion cylinder is commonly maintained open whilst the piston is near to the top dead centre position, the compression in the expansion cylinder is determined primarily by the pressure at its inlet, which may be connected to a pressure reservoir or accumulator. Combustion occurs whilst the inlet valve of the expansion cylinder is still open and combustion and expansion occur simultaneously leading to almost constant pressure during combustion. Closure of the inlet valve is adjusted to provide maximum overall expansion efficiency. The combustion process is therefore substantially isobaric. Following expansion of the combustion gases, the exhaust valve of the expansion cylinder is opened and the hot exhaust gas is directed through an exhaust port into the heat exchanger, thus providing the heat source that increases the temperature of the high pressure inlet charge to the expander cylinder. The two pistons effectively operate in two stroke mode and this, coupled with substantially isothermal compression and exhaust heat energy recovery, means that the engine has a very high brake thermal efficiency.

However, the known type of engine does suffer from a few disadvantages, particularly if it is used in an automotive application. The thermal capacity of the water is made use of in order to maintain the compression substantially isothermal. It is therefore necessary for a substantial volume of water to be injected and much of this is commonly collected immediately downstream of the compression cylinder. However, a proportion of the water passes through the heat exchanger and the expansion cylinder and in order to ensure that the water consumption of the engine is minimised, which is particularly important if the engine is an automotive engine and thus mounted on a vehicle, the exhaust gases are passed through a condenser including a cooling fan, which condenses the water, which is then returned to the water reservoir. The collecting and recycling of the water is complex and expensive and the use of a cooling condenser reduces the efficiency of the engine. Furthermore, in order to ensure effective heat transfer, the heat exchanger between the compression and expansion cylinders require a high surface area and therefore contains a significant volume of gas at high pressure. This can significantly reduce the rate at which the power output of the engine can be increased, such as when it is required to accelerate the vehicle, as it introduces a significant delay in changes to the charge air pressure and volume supply from the compression cylinder to the expansion cylinder. Furthermore, whilst the heat exchanger stores a limited amount of compressed gas at high pressure, this is too small to offer a method of energy storage or recovery that is desirable during vehicle braking or deceleration.

It is therefore the object of the present invention to provide an engine of the type referred to above, particularly for automotive use, which overcomes or at least mitigates the problems referred to above. More specifically, it is the object of the invention to eliminate the use of water and/or to increase the efficiency and specific output of the engine.

According to the present invention, the liquid that is injected is a liquefied non-oxidising, non combustible gas.

Whilst the gas may be an insert gas such as helium or argon it is preferred that nitrogen is used, particularly as it is readily available from the atmosphere.

The replacement of water, as used in conventional engines of this type, by a liquefied gas is found to have a number of advantages. Thus firstly, the thermal capacity of the gas is of minor significance compared to its latent heat of vaporisation, which is absorbed as the gas vaporises in the compression cylinder. The latent heat of vaporisation of gas is so high that the volume of gas which need be injected to achieve the desired result is considerably less than the volume of water which had to be injected in the known engine. Secondly, if nitrogen is used, it is not necessary to recover the gas downstream of the compression cylinder and nor is it necessary for a condenser to be provided downstream of the expansion cylinder since the nitrogen can be simply expelled to the atmosphere. Thirdly, the expanded liquefied gas in the compressed gas increases the mass of the gas and acts as ballast in the combustion process and thus inherently serves to increase the specific power output of the engine. Accordingly, the problems associated with the use of water are eliminated and the power output of the engine is increased, firstly as a result of the additional gas participating in the combustion/expansion process and secondly as a result of the elimination of the previously necessary water condenser.

Whilst the liquefied gas may be supplied from a pressurised tank, this may not be practicable, particularly in the case of an automotive engine, and it is therefore preferred that the engine includes a liquid nitrogen generator connected to be driven by the output of the engine and that the method includes operating the liquid nitrogen generator to produce liquid nitrogen from the atmosphere and injecting the liquid nitrogen produced into the compression cylinder.

The liquid nitrogen generator is preferably arranged to be driven at a selectively variable speed and in one embodiment of the invention the liquid nitrogen generator is operated, preferably at an increased speed, when the engine is decelerated, that is to say when the vehicle is decelerated if the engine is an automotive engine, to produce an amount of liquid nitrogen in excess of the instantaneous requirement. This excess liquid nitrogen may be stored in a reservoir and subsequently injected into the compression cylinder. The injection of an additional volume of liquid nitrogen into the compression cylinder will result in an increase in the power output of the engine as a result of the further reduction of the temperature of the compressed gases entering the expansion cylinder and as a result also of the increase in the mass of the gases participating in the compression and expansion processes. Accordingly, the generation of an excess of liquid nitrogen constitutes in effect a storage of energy for later use and the liquid nitrogen generator may therefore be used for regenerative braking of a vehicle in which the engine is incorporated, the kinetic energy of the vehicle, when braked, being converted into an increased volume of liquid nitrogen, the energy of which is subsequently released by injection of the liquid nitrogen into the compression cylinder at a time when an increase in the energy output of the engine is required.

As a practical matter, the liquid nitrogen generator is likely also to produce liquid oxygen and the method preferably includes using the liquid oxygen produced to cool the air admitted into the compression cylinder. This will further increase the efficiency and/or power output of the engine. The liquid oxygen is preferably used to cool the inflowing air indirectly, that is to say in a heat exchanger.

After flowing through the heat exchanger, the oxygen may be discharged directly into the atmosphere or into the exhaust duct upstream of the exhaust turbine of a turbocharger which will mean not only that the exhaust gases are cooled but that a greater mass of gas will flow through the turbine, hereby permitting a greater amount of energy to be extracted for turbocharging.

The compression piston and the expansion piston are typically coupled to a unitary crankshaft of the engine and therefore inherently move at the same speed. This means that at any given speed of the engine, the rate of production of compressed air is fixed. However, it may be desirable for the rate of production of compressed air to be controllable independently of the speed of the engine and it is therefore preferred that the compression piston and the expansion piston are connected to respective portions of a crankshaft which are connected together by a gear mechanism of variable transmission ratio and the method includes selectively varying the transmission ratio so that the compression piston and the expansion piston move at different speeds. Thus if, for instance, the engine is running at a low speed, which will normally mean that there is a low rate of production of compressed air by the compression cylinder, it is possible for the transmission ratio of the gear mechanism to be increased, e.g. to 2:1, 3:1 or more, whereby the rate of production of compressed air will increase. This would be desirable if it is desired to accelerate the engine abruptly from the low speed and may be used in conjunction with the injection of an additional amount of liquid nitrogen into the compression cylinder, as discussed above, thereby enabling the engine to accelerate very rapidly from a low speed. The performance of the engine may be additionally enhanced by the incorporation of a supercharger or, more specifically, a turbocharger, as is known in connection with internal combustion engines.

The present invention also embraces a split cycle reciprocating piston engine arranged to perform the method referred to above.

Further features and details of the invention will be apparent from the following description of one specific embodiment of engine in accordance with the invention, which is given by way of example only with reference to the accompanying highly diagrammatic drawing.

As shown, the engine comprises a compression cylinder 2 accommodating a compression piston 4, which is connected by a connecting rod 6 to a respective crank 8 on a portion 10 of a crankshaft. The engine also includes an expansion cylinder 12 accommodating an expansion piston 14, which is connected by a connecting rod 16 to a respective crank 18 on a further portion 20 of the crankshaft. Although only one compression cylinder 2 and expansion cylinder 12 are shown, it will be appreciated that there may be any desired number of any such cylinders and furthermore that the number of compression cylinders does not have to be the same as the number of the expansion cylinders and that the size of the two types of cylinder also need not be the same. The two portions 10,20 of the crankshaft are not integrally connected together to rotate at the same speed as is conventional, but are instead connected by a transmission system or gear box 22 of selectively variable transmission ratio. The crankshaft 10,20 is also connected to the propulsion transmission system 24 of the vehicle and this may be of conventional type and forms no part of the invention and will therefore not be described in more detail.

The compression cylinder 2 includes any number, in this case 2, of injection nozzles 26 in its side wall or cylinder head arranged to spray liquid nitrogen into the interior of the cylinder. The nozzles 26 communicate with a liquid nitrogen reservoir 28, as will be discussed below. The compression cylinder 2 includes an inlet duct 30, which is controlled by an inlet valve 31 and which includes one path of a heat exchanger 32 and in which is situated the turbine or blower wheel 33 of a turbocharger. The compression cylinder 2 also includes an outlet duct 36, which is controlled by an outlet valve 38. Due to the high pressure differentials that are created in engines of this type, the outlet valve 38 is of so-called pressure-compensated type. For this purpose, the valve stem carries a piston 40 reciprocably mounted in a chamber 42 and dividing it into two portions. That portion of the chamber which is furthest from the compression cylinder communicates with the interior of the compression cylinder via a passage 44 whilst that portion of the chamber which is closest to the compression cylinder communicates with the outlet duct 36 via passage 46.

The substantial pressure created in the compression cylinder 2 therefore acts not only on the outlet valve 38 in one direction but also on the piston 40 in the other direction, thereby permitting the outlet valve 38 to be opened without having to exert a very substantial force on it.

The outlet duct 36 from the compression cylinder 2 communicates with one end of one pathway through a heat exchanger or recuperator 50. The other end of that pathway through the heat exchanger communicates with the inlet duct 52 of the expansion cylinder 12. The inlet duct 52 communicates with the interior of the expansion cylinder via an inlet valve 54, which is again of pressure-compensated type and communicating with the interior of the cylinder 12 is a fuel injector 57. The expansion cylinder 12 also communicates with an outlet duct 56 controlled by an outlet valve 58. The outlet duct 56 includes the exhaust gas turbine 59 of the turbocharger and communicates with one end of a second pathway in the heat exchanger 50 in heat exchange relationship with the first pathway. The other end of the second pathway communicates with an exhaust duct 60, which discharges directly into the atmosphere. The heat exchanger also includes a bypass passage 62, which is controlled by selectively openable valve 64. This valve 64 is opened when the engine is to be started, thereby not incurring the pressure losses that are associated with flow through the heat exchanger. On start-up of the engine, the heat exchanger is of course cold, which means that there is no purpose in the compressed air flowing through it. During cold start conditions, the injection nozzles 26 are not operated, thereby allowing an increase in the end of compression temperature and a stable combustion in the expander cylinder. Once the heat exchanger has heated up, the valve 64 is closed and the injection nozzles 26 commence normal operation.

The liquid nitrogen reservoir 28 forms part of a liquid nitrogen generator of known Brayton/Joule/Thompson type. This generator includes a rotary compressor 70, whose shaft is connected to a turbine expander 72 and to the output of a variable ratio transmission system 74, the input of which is connected to the engine crankshaft. The liquid nitrogen generator also includes two heat exchangers 76, 78 and a fan-cooled aftercooler 80. In use, air is drawn into the liquid nitrogen generator by the compressor 70 through an inlet 82 and after compression, expansion and passing through the heat exchangers, liquid nitrogen is generated and passed to the reservoir 28 and liquid oxygen is also generated and discharged into a conduit 84, which is connected to the second path of the heat exchanger 32.

When in use on a motor vehicle, the engine is started in the manner described above. Once normal operation has commenced, substantially isothermal compression of the inlet air takes place in the compression cylinder 2. The inlet air flowing through the duct 30 into the compression cylinder 2 is pressurised by the turbocharger turbine 33 and is cooled by heat exchange in the heat exchanger 32 with the liquid oxygen produced by the nitrogen generator as a by-product. The compressed air leaves the compression cylinder 2 and is heated to a substantial temperature in the recuperator 50, whereafter it enters the compression cylinder 12. After the injection of fuel by the fuel injector 57, the fuel is combusted and work is done by moving the piston 14, thereby rotating the crankshaft. The exhaust gases from the expansion cylinder 12 flow past and rotate the exhaust turbine 59 of the turbocharger and then flow through the recuperator 50 to heat the incoming compressed air and then discharge to the atmosphere via the exhaust pipe 60. The liquid nitrogen injected by the injectors 26 vaporises in the compression cylinder 2, thereby maintaining the air cool, primarily as a result of the absorption of its latent heat of evaporation. The nitrogen then takes part in the subsequent combustion/expansion process and increases the mass of the gas participating in that process and thereby increases the power output of the engine. The nitrogen is then discharged to the atmosphere from which it was initially obtained. The liquid nitrogen generator will generate liquid nitrogen at a rate determined by the speed at which the compressor 70 is driven. That speed is in turn determined by the transmission ratio of the transmission system 74 and the transmission ratio of the gear box 22, both of which will be determined in practice by a controller constituting or forming part of the engine management system with which most modern vehicles are now equipped. The controller ensures that the rate of generation of liquid nitrogen is sufficient to maintain an adequate store of liquid nitrogen in the reservoir 28. If the controller senses that the vehicle is being braked, the speed of the compressor 70 will be increased by increasing the transmission ratio of the transmission system 74 and/or of the gear box 22, thereby increasing the rate of production of liquid nitrogen to a level above that required for immediate consumption. This will result in an increase in the amount of liquid nitrogen in the reservoir 28 and this can be injected into the compression cylinder 2 at a later stage when increased power output is required, as described above. If, when the vehicle is braked, the transmission ratio of the gear box 22 is increased, this will result in an increase in the speed of the compression piston 4 by comparison with that of the expansion piston 14. This will result in the production of an amount of compressed air in excess of current requirements but such excess compressed air could be stored in a pressure reservoir and then used at a later stage, when an increased power output from the engine is required. This represents an additional method of energy storage for the purpose of regenerative braking. Furthermore, if the engine is operating at low speed and it is then desired to accelerate rapidly, the transmission ratio of the gear box 22 may be increased to increase the rate of generation of compressed air by the compression cylinder 2, and this will result in a more rapid increase in the power output of the engine, particularly if coupled with an increased rate of injection of liquid nitrogen from the reservoir 28.

The invention claimed is:

1. A method of operating a split cycle reciprocating piston engine including a compression cylinder accommodating a compression piston, an expansion cylinder accommodating an expansion piston, the compression cylinder having an inlet port for the admission of air and an outlet port which communicates with a first path of a heat exchanger, the expansion cylinder having an inlet port, which communicates with the first path of the heat exchanger, and an outlet port which communicates with a second path of the heat exchanger in heat exchange relationship with the first path, the method including injecting a liquid into the compression cylinder, characterised in that the liquid is a liquefied, non-oxidising, non-combustible nitrogen gas.

2. A method as claimed in claim 1 in which the engine includes a liquid nitrogen generator connected to be driven by the output of the engine and the method includes operating the liquid nitrogen generator to produce liquid nitrogen from the atmosphere and injecting the liquid nitrogen produced into the compression cylinder.

3. A method as claimed in claim 2 which includes operating the liquid nitrogen generator when the engine is decelerated to produce an amount of liquid nitrogen in excess of the instantaneous requirement.

4. A method as claimed in claim 3 in which the nitrogen generator also produces liquid oxygen and the method includes using the liquid oxygen to cool the air admitted into the compression cylinder.

5. A method as claimed in claim 3 which includes operating the liquid nitrogen generator at an increased speed when the engine is decelerated to produce an amount of liquid nitrogen in excess of the instantaneous requirement.

6. A method as claimed in claim 1 in which the compression piston and the expansion piston are connected to respective portions of a crankshaft which are connected together by a gear mechanism of variable transmission ratio and the method includes selectively varying the transmission ratio so that the compression piston and the expansion piston move at different speeds.

7. A split cycle reciprocating piston engine including a compression cylinder accommodating a compression piston, an expansion cylinder accommodating an expansion piston, the compression cylinder having an inlet port for the admission of air and an outlet port which communicates with a first path of a heat exchanger, the expansion cylinder having an inlet port, which communicates with the first path of the heat exchanger, and an outlet port, which communicates with a second path of the heat exchanger in heat exchange relationship with the first path, a liquid injector for injecting a liquid into the compression cylinder and a liquid reservoir communicating with the liquid injector for storing the liquid to be injected, characterised in that the liquid reservoir is a liquefied gas reservoir, the split cycle reciprocating piston engine further including a liquid nitrogen generator which is connected to be driven by the output of the engine and is arranged to produce liquid nitrogen from the atmosphere and to supply it to the gas reservoir.

8. An engine as claimed in claim 7 including a control system and a drive unit connected thereto connected between the engine output and the liquid nitrogen generator, the control system being programmed to detect when the engine is decelerated and to operate the drive unit, preferably at an increased speed, so that the liquid nitrogen generator produces liquid nitrogen in an amount in excess of the instantaneous requirement.

9. An engine as claimed in claim 7 in which the liquid nitrogen generator is arranged also to produce liquid oxygen at a liquid oxygen outlet and the liquid oxygen outlet communicates with the inlet port of the compression cylinder.

10. An engine as claimed in claim 7 in which the compression piston and the expansion piston are connected to respective portions of a crankshaft which are connected together by a gear mechanism of variable transmission ratio and the method includes selectively varying the transmission ratio so that the compression piston and the expansion piston move at different speeds.

11. An engine as claimed in claim 7 in which the compression piston and the expansion piston are connected to respective portions of a crankshaft which are connected together by a gear mechanism of variable transmission ratio to selectively vary the transmission ratio so that the compression piston and the expansion piston move at different speeds.

12. An engine as claimed in claim 7 including a control system and a drive unit connected thereto connected between the engine output and the liquid nitrogen generator, the control system being programmed to detect when the engine is decelerated and to operate the drive unit at an increased speed so that the liquid nitrogen generator produces liquid nitrogen in an amount in excess of the instantaneous requirement.

* * * * *